(12) United States Patent
Martinez

(10) Patent No.: US 6,588,911 B1
(45) Date of Patent: Jul. 8, 2003

(54) THREE-PIECE INTERIOR REAR VIEW MIRROR ASSEMBLY

(76) Inventor: Jose L. Martinez, 817 E. Plaza St., Weslaco, TX (US) 78596

( * ) Notice: Subject to any disclaimer, the term of this patent is extended or adjusted under 35 U.S.C. 154(b) by 0 days.

(21) Appl. No.: 10/161,548

(22) Filed: Jun. 4, 2002

(51) Int. Cl.[7] .............................................. G02B 7/182
(52) U.S. Cl. ...................... 359/854; 359/855; 359/856; 359/857
(58) Field of Search ................................ 359/854, 855, 359/856, 857, 861, 862, 871, 872; 248/474, 476, 477, 479

(56) References Cited

U.S. PATENT DOCUMENTS

| | | | | |
|---|---|---|---|---|
| 3,645,607 A | * | 2/1972 | Whitney | ..................... 359/861 |
| 4,701,036 A | * | 10/1987 | Bowers | ..................... 359/861 |
| 4,907,871 A | * | 3/1990 | Hou | ..................... 359/841 |
| 5,379,198 A | * | 1/1995 | Zhang | ..................... 362/494 |
| 5,946,150 A | * | 8/1999 | Liao | ..................... 359/871 |
| 6,412,965 B2 | * | 7/2002 | Menefee | ..................... 359/881 |

* cited by examiner

*Primary Examiner*—Mohammad Sikder
(74) *Attorney, Agent, or Firm*—Edward D. Gilhooly

(57) ABSTRACT

A three piece interior rear view mirror assembly for a vehicle having an upper mirror and a lower mirror, and a lower left and a lower right mirror independently mounted beneath the upper mirror. The left and right mirrors are disposed at a position between the upper mirror and the windshield. The upper, right and left mirrors are each independently adjustable on socket and sphere mountings. The entire rear view mirror assembly is further mounted on sphere and socket mountings adjacent the windshield of the vehicle.

10 Claims, 5 Drawing Sheets

THREE-PIECE INTERIOR REAR VIEW MIRROR ASSEMBLY

BACKGROUND OF THE INVENTION

1. Field of the Invention

This invention relates in general to rear view mirrors for vehicles, and more particularly, to a three-piece interior rear view mirror assembly for vehicles.

2. Summary of the Prior Art

Various designs of rear view mirror assemblies have been used for vehicles. In operation of a vehicle, such as, for example, an automobile, known mirror designs have not attained the important safety objectives of the capability of simultaneously observing the rear as well as any blind spots to the left and right of the vehicle with minimal head movement. Prior mirror systems commonly utilize an interior mirror that is normally used in conjunction with right and left exterior mirrors. Such standard systems require considerable head movement by the driver to observe blind spots on either side of the vehicle for changing lanes, passing, and other driving maneuvers. For safe driving, it is desirable to minimize head movement as much as possible and look straight ahead while driving. The past use of two exterior rear view mirrors and an interior mirror limits the angle of view to an undesirable 100° to 120° of the entire 180° visual field to the rear of the vehicle. Recent mirror designs have been modified in an attempt to increase the visual rear view, but such prior techniques have not been wholly successful. Some newer mirror systems have employed additional mirrors which may have a concave or convex configuration to increase blind spot observations, but with severe distortion of distance and of the appearance of the object being observed. Accordingly, it is desirable in the vehicle industry to increase the angle of view of the rear of vehicle to eliminate blind spots and to reduce head movement during driving.

SUMMARY OF THE INVENTION

It is therefore an objective of the invention to provide a three piece interior rear view mirror assembly capable of reducing blind spots and head movement of a vehicle operator. Each of the three mirrors of the assembly of the invention are independently adjustable to view both rear sides and directly to the rear of the vehicle. The three mirrors herein disclosed are independently mounted on spherical joints for permitting universal adjustment to accommodate all vehicles, driver physical characteristics and encountered conditions. The invention herein attains an optimum view to the rear of the vehicle with a design that is convenient to use. Visual observance of conventionally encountered blind spots is readily attained in accordance with the invention without distortion of the reflection and of the distance of any objects being viewed. The three piece assembly of the application is economical to manufacture and install in the vehicle.

DESCRIPTION OF THE PREFERRED EMBODIMENTS

Figure 1:
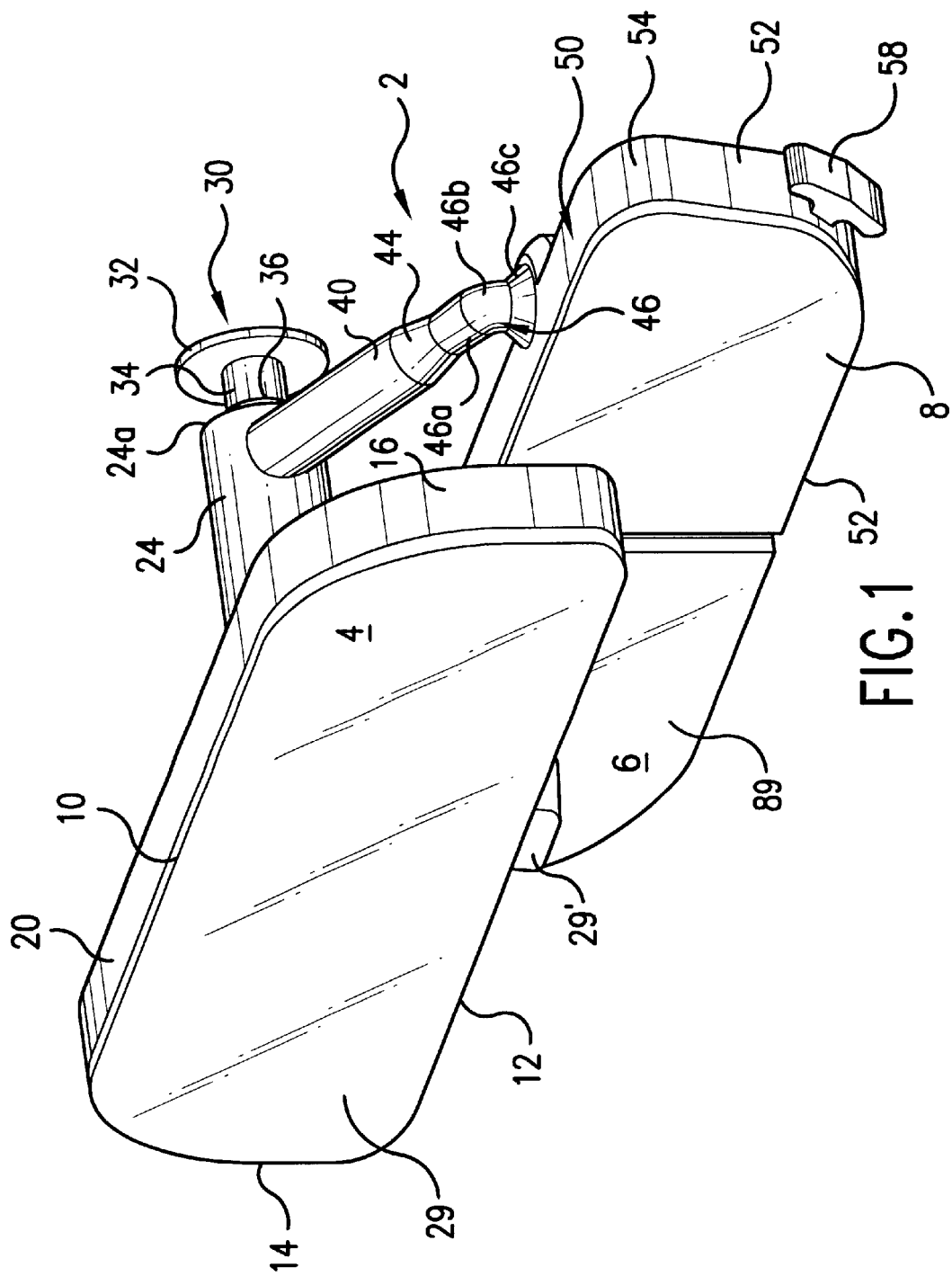
FIG. 1 is a front perspective view of the three piece interior rear view mirror assembly of the invention.
Figure 2:
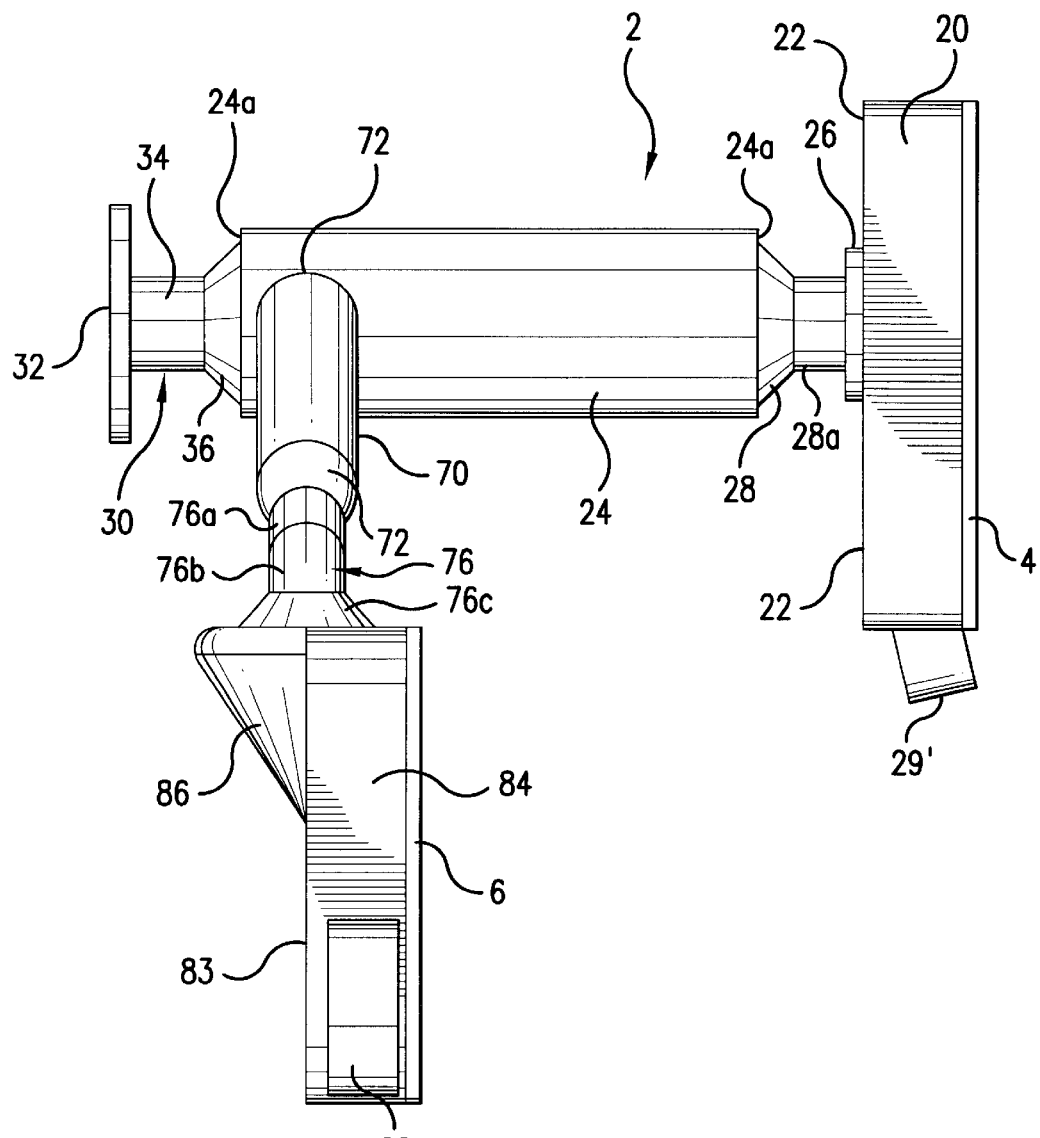
FIG. 2 is a side elevational view of the three piece interior rear view mirror assembly of FIG. 1.
Figure 3:
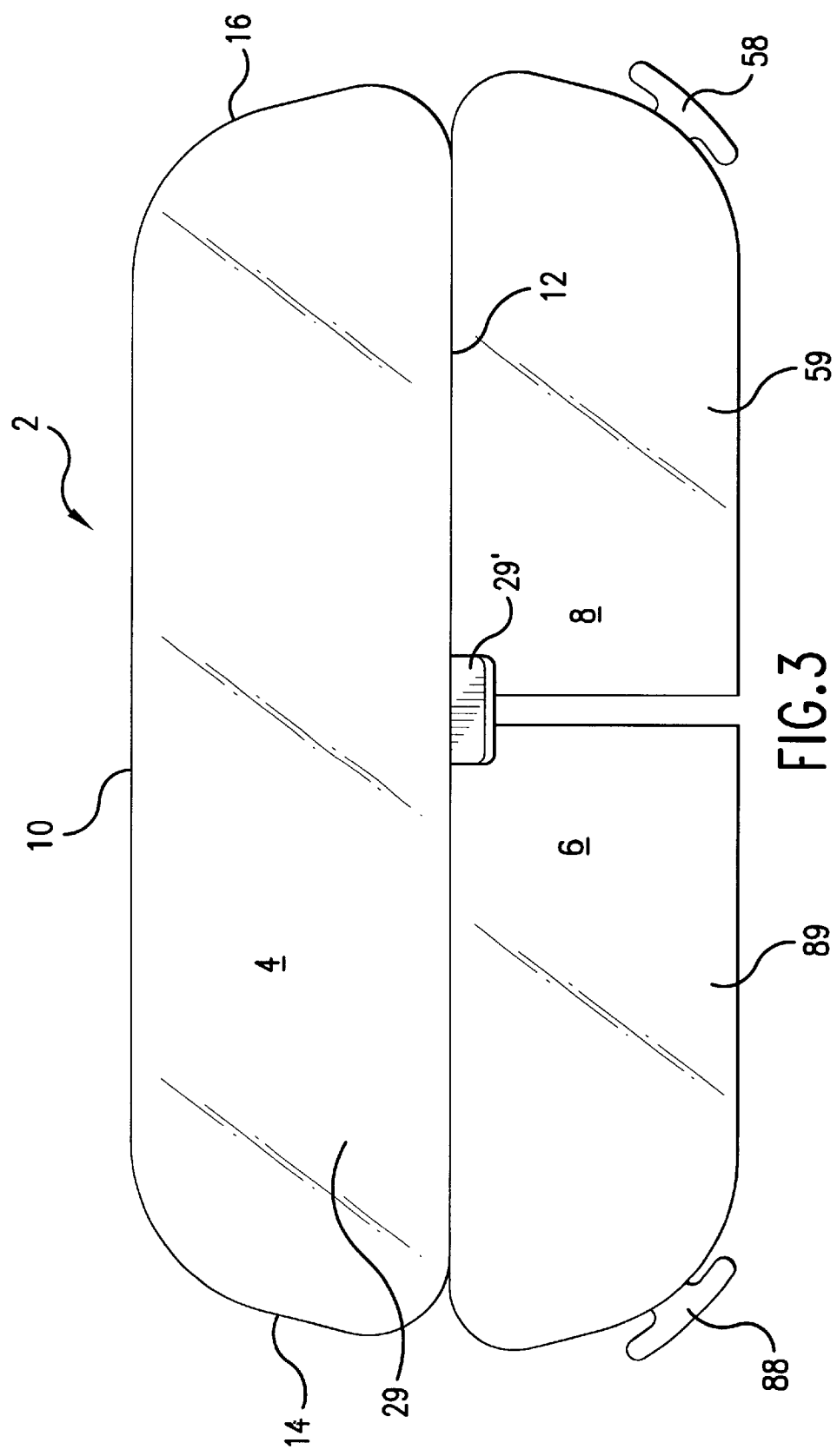
FIG. 3 is a front elevational view of the three piece interior rear view mirror assembly of FIG. 1.
Figure 4:
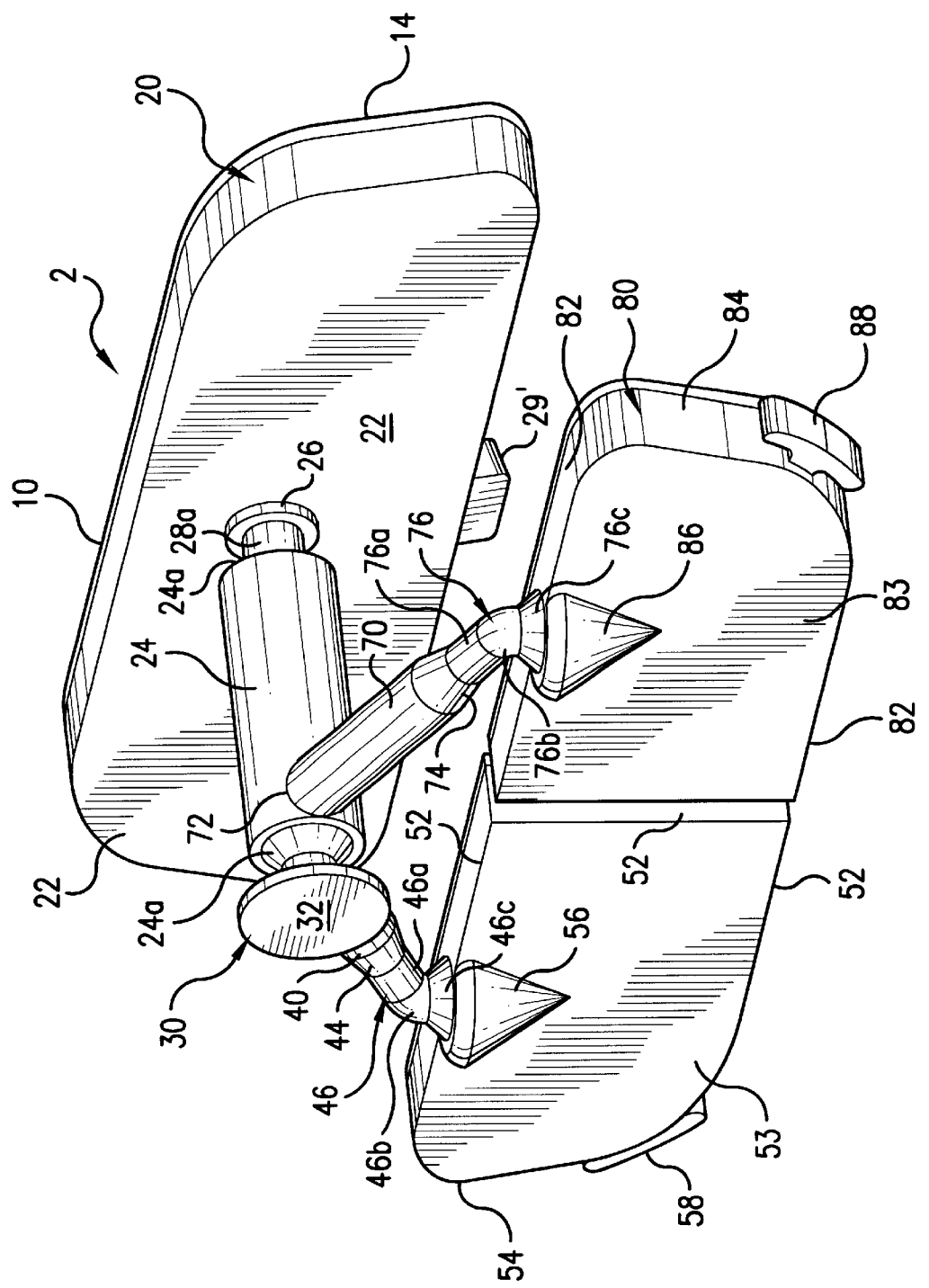
FIG. 4 is a rear perspective view of the three piece interior rear view mirror assembly of FIG. 1.
Figure 5:
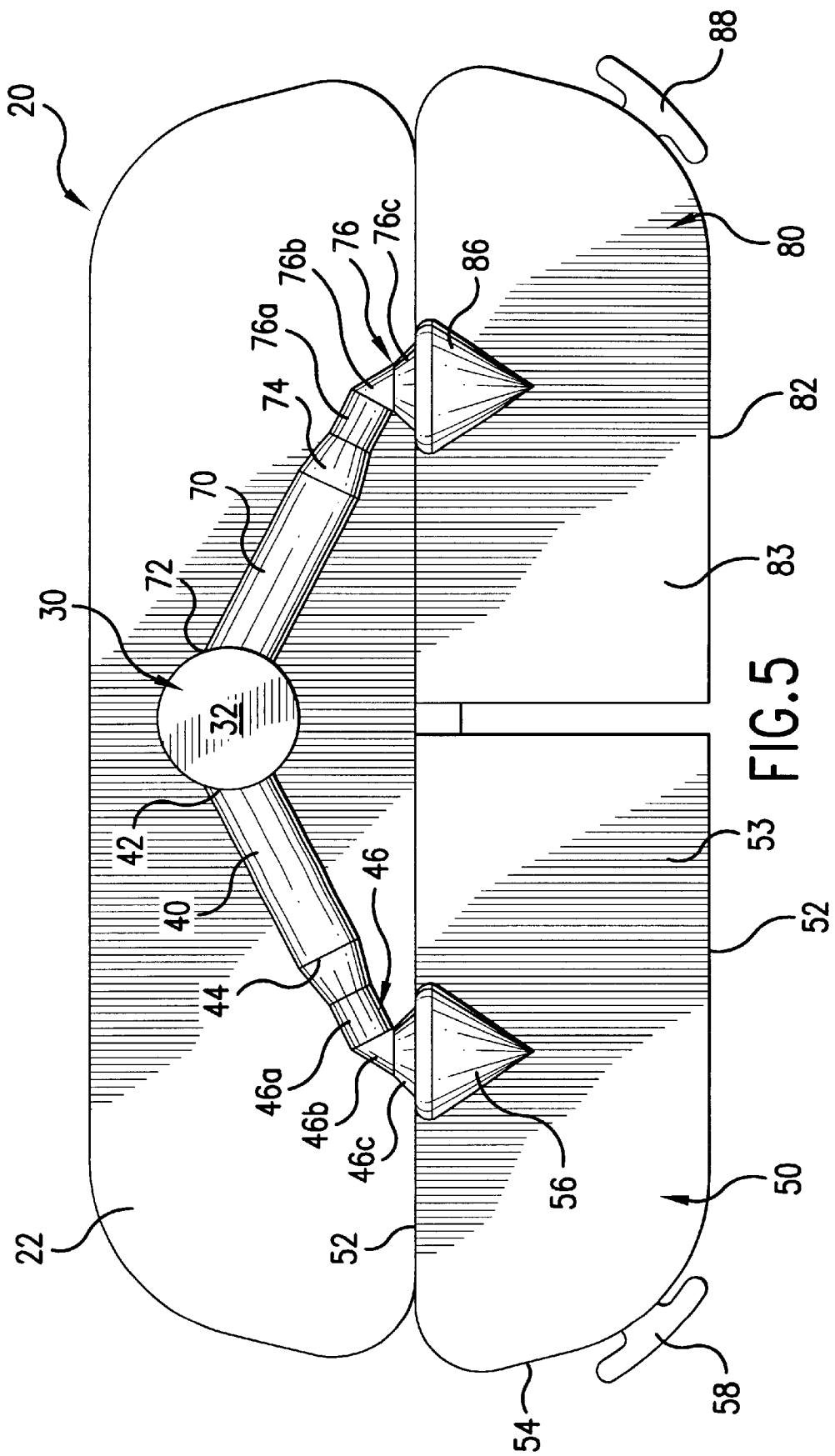
FIG. 5 is a rear elevational view of the three piece interior rear view mirror assembly of FIG. 1.

Referring now to FIGS. 1 to 5, there is illustrated the three piece interior rear view mirror assembly of the invention generally, designated by reference numeral 2. The rear view mirror assembly 2 includes a main upper mirror 4, and lower left mirror 6 and right mirror 8. The mirrors 4, 6, and 8 are mounted on a vehicle (not shown) in a manner to be described. The lower mirrors 6 and 8 are positioned in front of upper mirror 4 to be situated closer to the windshield (not shown) of the vehicle, which vehicle may be an automobile, SUV, truck, and the like. The main mirror 4 has upper and lower sides 10, 12, and at least partially curved end portions 14, 16 that are secured to a metal or plastic frame 20 surrounding mirror 4. As seen in FIGS. 2, 4, and 5, the frame 20 includes a back wall 22 to support the end of a main primary mount hollow bar 24 having hollow ends 24a. A flat end disk 26 is affixed to the back wall 22 in a conventional manner and receives and fixedly attaches a steel or plastic sphere 28 (FIG. 2) mounted on post 28a by welding or other suitable attachment technique. The sphere 28 is positioned within a hollow end 24a of primary mount shaft 24 to allow rotation or tilting of the mirror 4 relative to the primary mount shaft 24. The sphere 28 is adjustable while mounted within the end 24a of the primary mount bar 24 for limited universal adjustment of the main mirror 4 relative to the primary mount bar 24 in all directions as desired by the vehicle operator. The main mirror frame 20 retains the upper main mirror 4 that has a flat face 29. The upper main mirror 4 is primarily used to observe areas directly at the rear of the vehicle. The main mirror 4 may be manipulated for adjustment by grip 29'. As seen in FIGS. 1,2,4, and 5, the primary mount bar 24 is supported on the windshield (not shown) by a windshield mount anchor 30 having a flat end disk 32 capable of being secured to the windshield in a conventional manner, such as by an adhesive and the like. The mount 30 includes a fixed tubular neck 34 that is welded to disk 32 or otherwise attached, on which a steel or plastic sphere 36 also is affixed by welding and the like. The hollow end 24a of primary mount bar 24 captures the sphere 36 for retention within the primary mount mark and permitting relative adjusting movement of primary mount bar 24 on sphere 36 to attain adjustable rotation and tilting movement of the entire three piece interior mirror assembly 2 relative to the windshield.

As best seen in FIGS. 1 and 5, a right mirror mount bar 40 is fixedly secured by welding and the like at its upper end 42 to the primary main mount bar 24. As best seen in FIGS. 1, 4 and 5 the lower end 44 of right mirror mount bar 40 is welded or otherwise affixed to a sphere mount 46 having a mount bar 46a, a steel neck 46b, and steel or plastic sphere 46c. The right hand mirror 8 has a slightly convex face 59, in a side to side direction for better observation of blind spots on the right of the vehicle. The right hand mirror 8 is retained in a lower right mirror frame 50 having straight sides 52, back wall 53 and an outer particularly curved edge portion 54. As seen in FIGS. 1,4 and 5, the sphere 46c is mounted in a socket of a mirror frame mount 56 to permit the right mirror 8 to be rotated and tilted as desired by the vehicle operator, adjustment through manipulation grip 58.

As best seen in FIGS. 2,4, and 5, a left mirror mount bar 70 is fixedly secured at its upper end 72 to the primary main mount bar 24. The lower end 74 of left mirror mount bar 70 is welded or otherwise affixed to a sphere mount 76 having a mount bar 76*a*, a steel neck 76*b*, and a steel or plastic sphere 76*c*. The left hand mirror 6 has a slightly convex face 89, in a side to side direction for better observation of blind spots on the left of the vehicle. The left hand mirror 6 is retained in a lower left mirror frame 80, which is aligned, but separated from right mirror frame 50, and has straight sides 82, back wall 83, and an outer particularly curved edge portion 84. As seen in FIGS. 2,4, and 5, the sphere 76*c* is mounted in a socket of a mirror frame mount 76, which is affixed to frame 80, allowing mirror 6 to be rotated and tilted as desired by the vehicle operator, adjustment through manipulation of grip 88. Both mountings of the left hand mirror 6 and right hand mirror 8 have stops (not shown) to limit movement of mirror frames 50 and 80 so that they do not come in contact Wraith each other. It should be apparent that lower mirrors 6 and 8 are significantly closer to windshield for optimum rear observation of blind spots.

What is claimed is:

1. An interior rear view mirror assembly for attachment to a windshield for providing visual observations to the rear of vehicle, comprising first mirror means generally reflects images directly from the direct rear of the vehicle, primary mount means operatively attached to said first mirror means at one end portion, said primary mount means being operatively attached to securement means, said securement means attaching said primary mount means to the windshield of the vehicle, said primary mount means having socket means for adjustably attaching said primary mount means to said securement means, adjusting means for adjustably connecting said first mirror means to said primary mount means, first secondary mount means being affixed to said primary mount means and extending downward from said primary mount means, second mirror means being adjustably mounted on said first secondary mount means beneath said first mirror means, said second mirror means reflecting images from the right rear of the vehicle, second secondary mount means being affixed to said primary mount means and extending downward, and;

third mirror means being adjustably mounted on said second secondary mount means beneath said first mirror means, said third mirror means reflecting to the left rear to the left rear of the vehicle.

2. The interior rear view mirror assembly according to claim 1 wherein said second mirror means and said third mirror means are positioned side by side to each other.

3. The interior rear view mirror assembly according to claim 2 wherein said second mirror means and third mirror means are disposed at a position between said first mirror means and the windshield.

4. The interior rear view mirror assembly according to claim 1 wherein said second mirror means and said third mirror means each have a convex reflective surface.

5. The interior rear view mirror assembly according to claim 4 wherein said first mirror means has a flat reflective surface.

6. The interior rear view mirror assembly according to claim 3 wherein said first mirror means, said second mirror means and said third mirror means respectively have first frame means supporting a reflective mirror, second mirror means supporting a reflective mirror and a third frame means supporting a reflective mirror.

7. The interior mirror assembly according to claim 6 wherein said second and third frame means each include a socket for receiving a sphere, a respective sphere being affixed to said first and second secondary mount means, each of said spheres being received in said socket of said second frame means and said second frame means to permit rotational universal independent movement of said second mirror means and said third mirror means.

8. The interior rear view mirror assembly according to claim 7 wherein said primary mount means includes a socket, a sphere being affixed to said first frame means and being received in said socket for universal rotational movement to adjust the direction of view of said first mirror means.

9. The interior rear view mirror assembly according to claim 8 wherein said securement means includes a sphere, said primary mount means having socket means for receiving said sphere for rotational movement for combined adjustment of said first mirror means, said second mirror means and said third mirror means.

10. The interior rear view mirror assembly according to claim 9 wherein said first frame means, said second frame means and said third frame means each include manual grips for independent adjustment of said first mirror means, said second mirror means, and said third mirror means.

* * * * *